United States Patent Office 3,810,828
Patented May 14, 1974

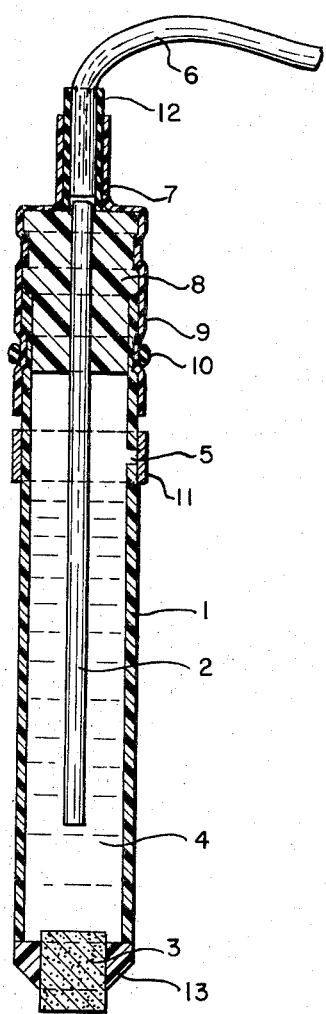

3,810,828
REFERENCE ELECTRODE
Alfons Seth Mikael Lindholm, Nol, Sweden, assignor to Aktiebolaget Tudor, Stockholm, Sweden
Filed Dec. 20, 1971, Ser. No. 210,082
Int. Cl. G01n 27/30
U.S. Cl. 204—195 F
1 Claim

ABSTRACT OF THE DISCLOSURE

A reference electrode using cadmium metal for measuring the electrode potential in a lead-acid cell. The electrode is mounted in a cylindrical casing which has a porous plug at its lower end. Electrolyte in the cylindrical casing rapidly contacts the measurement solution (battery electrolyte) when the electrode housing is inserted through a fill cap opening in the cell housing.

---

This invention relates to a reference or auxiliary electrode used for measuring electrode potential in a lead-acid accumulator cell for the purpose of determining progressive changes that take place in a battery during its use. More specifically, the present invention relates to a cadmium electrode which can be inserted through the fill cap opening in the cell housing.

The potential of the electrode in relation to the hydrogen electrode is 380 mv. and the difference from a cadmium electrode is unimportant. The reference electrode in accordance with the invention consists principally of a cadmium wire or rod immersed in dilute $CdSO_4$ solution which is buffered with $KHSO_4$ to have a pH less than 2.0 and preferably about 1.7. The electrode is so constructed that the measurement solution is not contaminated with liberated cadmium ions.

The subject of the invention is a cadmium type reference electrode the potential of which is determined by the electrode reaction $Cd—Cd^{2+}+2e$. The normal potential for the reaction is 403 mv. by comparison with the hydrogen electrode (NHE), and the electrode in accordance with the invention exhibits a potential which is not significantly different from this value. The difference which does exist can be explained from the coefficients of activity of the components and can go up to about 20 mv.

The special advantages and characteristic features of a reference electrode in accordance with the present invention are its stability even after relatively long storage and the short time which the electrode needs in wet contact with the measuring solution to give a reading.

It is customary when testing batteries to use a cadmium plate for measuring the potential of the electrode. In order to be able to carry out more accurate measurements, there have been used, instead of the Cd plate, which is unstable when used for measuring values, conventional reference electrodes such as potassium and mercury/mercury sulphate electrodes.

It is an object of the invention to provide a novel reference electrode which can completely replace the cadmium plate as a reference electrode and at the same time make it possible to obtain measurement results fully of the same accuracy as those which can be obtained with the above-mentioned conventional reference electrodes. Thanks to its small dimensions and suitable construction, it is furthermore possible to make the measurement by insertion of the electrode through the hole for the battery filling plug and thus measurements can be carried out rapidly and without complications.

Other objects will become apparent from the claims, and from the description as it proceeds in connection with the appended drawing wherein:

The figure is a longitudinal view in section of one embodiment of the invention.

In the attached drawing, an example of an embodiment of the invention is illustrated which consists of a cadmium wire 2 immersed in a solution containing 1 M

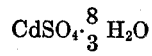

and 0.05 M $KHSO_4$. The pH value of the solution is between 2.0 and 1.5 preferably about 1.7. On account of the relatively high liquid overvoltage for cadmium, a very slight dissolving of the cadmium wire occurs. The buffer action is effected with $KHSO_4$ and as a result, small quantities of the surrounding solution which are sucked by capillary action into the electrolyte can be buffered and are therefore unable to damage the electrode, or to alter the balance in the electrolyte.

A tube 1 of transparent acidproof material, for example, of methylmethacrylate, encloses a body in the form of a stick 2 of substantially pure cadmium metal. The stick 2 may actually be a rod or wire. The diameter of the tube 1, and particularly, the lower portion thereof, is preferably of a size such that it can be inserted through the fill cap opening in a conventional lead-acid storage battery. Plug 3 fits tightly in a bushing 13 in the bottom of the tube 1. Plug 3 is sufficiently porous as to allow rapid contact between the electrolyte 4 in tube 1 and the electrolyte or measurement solution in the battery. An aperture 5 is provided in the periphery of the tube 1 and covered by a slidable sealing member 11. An electrical conductor lead 6, which is advantageously in a shielded or screened cable, is connected between the cadmium electrode 2 and an external meter (not shown). A relatively rigid rubber tube 12 surrounds the lead 6 and its point of connection to the cadmium electrode 2.

The cadmium electrode 2 is held securely in the center of the tube by means of a plug 8 made of an electrolyte resistant, insulating material which extends over plug 8 and along the upper portion of tube 1 to serve as a seal and to protect the upper portion of the electrode. Hose 9 may be shrunk onto the tube 1 and held in place as by an O-ring 10. The upper portion 7 conforms to the shape of plug 8 and tightly surrounds the rigid tube 12 which surrounds the electrical lead 6.

When the reference electrode of the invention is in use, the aperture 5 is open to the atmosphere. When the lower end of tube 1 is inserted through a fill cap opening into a cell, this allows a slow through-flow of electrolyte 4 from the tube 1 through the porous plug 3, which through-flow, however, is so slight that it can be ignored as a contamination of the measurement solution (i.e., battery electrolyte). In the present case, in the same way as with other conventional reference electrodes, one may disregard the liquid potential between the measurement solution and electrolyte.

Aperture 5 is closed when the reading is completed and tube 1 is removed from the cell being tested.

Ordinarily, when the prior art cadmium electrodes have become dry, they must be soaked for at least half an hour before being used again. If the electrode of the present invention has been kept in the dry state, it takes only a few minutes before complete wet contact can be achieved, during which time the potential of the electrode increases by about 15 mv.

The present invention may be embodied in other specific forms without departing from the spirit or essential characteristics thereof. The presently disclosed embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and intended to be covered by Letters Patent is:

1. A reference electrode for measuring electrode potentials in lead-acid cells comprising:

an elongated tubular casing of electrolyte resistant insulating material having a longitudinal axis and one end shaped for insertion through a fill cap opening in a lead-acid cell;

an elongated electrode of cadmium metal having a longitudinal axis that is substantially parallel with the longitudial axis of the casing;

means supporting one end of said cadmium electrode in said casing;

an electrochemically stable electrolyte enclosed in said casing and surrounding said cadmium electrode, said electrolyte being $CdSO_4$ buffered with $KHSO_4$ to have a pH less than 2.0;

electrical conductor means connected to said electrode and extending from said casing at the supported end of the eletrode; and plug means at said one casing end being sufficiently porous to allow electrolyte contact through diffusion upon insertion of one casing end into said cell.

References Cited

UNITED STATES PATENTS

| | | | |
|---|---|---|---|
| 3,272,731 | 9/1966 | Hutchison et al. | 204—195 F |
| 2,338,713 | 1/1944 | Ewing | 204—195 F |
| 1,779,232 | 10/1930 | Handforth | 204—195 F |
| 2,345,465 | 3/1944 | Miles et al. | 204—195 F |
| 3,282,818 | 11/1966 | Nolan | 204—195 F |
| 3,103,480 | 9/1963 | Watanabe et al. | 204—195 F |
| 3,676,319 | 7/1972 | Kirsten | 204—195 F |
| 3,530,056 | 9/1970 | Haddad | 204—195 F |

FOREIGN PATENTS

| | | | |
|---|---|---|---|
| 1,157,816 | 11/1963 | Germany | 204—195 F |

TA-HSUNG TUNG, Primary Examiner

U.S. Cl. X.R.

136—182; 324—29.5